(12) United States Patent
Doorhy et al.

(10) Patent No.: US 9,026,486 B2
(45) Date of Patent: May 5, 2015

(54) PHYSICAL INFRASTRUCTURE MANAGEMENT SYSTEM

(71) Applicant: Panduit Corp., Tinley Park, IL (US)

(72) Inventors: Brendan F. Doorhy, Westmont, IL (US);
Shahriar B. Allen, Naperville, IL (US);
James F. Wiemeyer, Homer Glen, IL (US); Robert E. Wilcox, Monee, IL (US); Donald J. Beran, Tinley Park, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 14/269,222

(22) Filed: May 5, 2014

(65) Prior Publication Data

US 2014/0258200 A1 Sep. 11, 2014

Related U.S. Application Data

(63) Continuation of application No. 13/666,430, filed on Nov. 1, 2012, now Pat. No. 8,719,205, and a continuation of application No. 12/640,160, filed on Dec. 17, 2009, now Pat. No. 8,306,935.

(51) Int. Cl.
*G06F 1/16* (2006.01)
*G06N 5/02* (2006.01)
*H04L 12/26* (2006.01)
*H04L 12/24* (2006.01)

(52) U.S. Cl.
CPC ............. *G06N 5/02* (2013.01); *H04L 41/0213* (2013.01); *H04L 41/0806* (2013.01); *H04L 41/12* (2013.01); *H04L 41/22* (2013.01); *H04L 43/0811* (2013.01); *Y02B 60/43* (2013.01)

(58) Field of Classification Search
USPC .......................................... 706/45
See application file for complete search history.

(56) References Cited

U.S. PATENT DOCUMENTS

| 3,052,842 A | 9/1962 | Frohman et al. |
| 3,431,428 A | 3/1969 | Van Valer |
| 3,573,789 A | 4/1971 | Sharp et al. |

(Continued)

FOREIGN PATENT DOCUMENTS

| EP | 0297079 B1 | 3/1992 |
| EP | 0575100 B1 | 12/1993 |

(Continued)

OTHER PUBLICATIONS

"Finding the Missing Link," Cabling Installation & Maintenance, Jun./Jul. 2002.

(Continued)

*Primary Examiner* — David Vincent
*Assistant Examiner* — Ola Olude Afolabi
(74) *Attorney, Agent, or Firm* — Christopher S. Clancy; Yuri Astvatsaturov

(57) ABSTRACT

Systems and methods of the present invention allow for the discovery of physical location information about network assets and the delivery of that information to network administrators. In addition, environmental and other information about network asset locations can be provided to an administrator. Intelligent patch panels and power outlet units are installed in network cabinets to facilitate the acquisition and reporting of physical infrastructure information, including information about network resource availability.

19 Claims, 7 Drawing Sheets

(56) References Cited

U.S. PATENT DOCUMENTS

| | | |
|---|---|---|
| 3,573,792 A | 4/1971 | Reed |
| 3,914,561 A | 10/1975 | Schardt et al. |
| 4,018,997 A | 4/1977 | Hoover et al. |
| 4,072,827 A | 2/1978 | Oman |
| 4,096,359 A | 6/1978 | Barsellotti |
| 4,140,885 A | 2/1979 | Verhagen |
| 4,169,220 A | 9/1979 | Fields |
| 4,196,316 A | 4/1980 | McEowen et al. |
| 4,517,619 A | 5/1985 | Uekubo |
| 4,673,246 A | 6/1987 | Schembri |
| 4,773,867 A | 9/1988 | Keller et al. |
| 4,796,294 A | 1/1989 | Nakagawara |
| 4,869,566 A | 9/1989 | Juso et al. |
| 4,890,102 A | 12/1989 | Oliver |
| 4,901,004 A | 2/1990 | King |
| 4,937,529 A | 6/1990 | O'Toole, III et al. |
| 4,937,835 A | 6/1990 | Omura |
| 5,037,167 A | 8/1991 | Beaty |
| 5,081,627 A | 1/1992 | Yu |
| 5,107,532 A | 4/1992 | Hansen et al. |
| 5,111,408 A | 5/1992 | Amjadi |
| 5,145,380 A | 9/1992 | Holcomb et al. |
| 5,161,988 A | 11/1992 | Krupka |
| 5,170,327 A | 12/1992 | Burroughs |
| 5,204,929 A | 4/1993 | Machall et al. |
| 5,222,164 A | 6/1993 | Bass, Sr. et al. |
| 5,226,120 A | 7/1993 | Brown et al. |
| 5,233,501 A | 8/1993 | Allen et al. |
| 5,265,187 A | 11/1993 | Morin et al. |
| 5,270,658 A | 12/1993 | Epstein |
| 5,305,405 A | 4/1994 | Emmons et al. |
| 5,353,367 A | 10/1994 | Czosnowski et al. |
| 5,375,028 A | 12/1994 | Fukunaga |
| 5,394,503 A | 2/1995 | Dietz, Jr. et al. |
| 5,432,847 A | 7/1995 | Hill et al. |
| 5,459,478 A | 10/1995 | Bolger et al. |
| 5,463,706 A | 10/1995 | Dumont et al. |
| 5,483,467 A | 1/1996 | Krupka et al. |
| 5,487,666 A | 1/1996 | DiGiovanni |
| 5,521,902 A | 5/1996 | Ferguson |
| 5,532,603 A | 7/1996 | Bottman |
| 5,546,282 A | 8/1996 | Hill et al. |
| 5,550,755 A | 8/1996 | Martin et al. |
| 5,583,874 A | 12/1996 | Smith et al. |
| 5,666,453 A | 9/1997 | Dannenmann |
| 5,684,796 A | 11/1997 | Abidi et al. |
| 5,726,972 A | 3/1998 | Ferguson |
| 5,727,055 A | 3/1998 | Ivie et al. |
| 5,754,112 A | 5/1998 | Novak |
| 5,764,043 A | 6/1998 | Czosnowski et al. |
| 5,790,041 A | 8/1998 | Lee |
| 5,832,071 A | 11/1998 | Voelker |
| 5,847,557 A | 12/1998 | Fincher et al. |
| 5,854,824 A | 12/1998 | Bengal et al. |
| 5,870,626 A | 2/1999 | Lebeau |
| 5,876,240 A | 3/1999 | Derstine et al. |
| 5,878,030 A | 3/1999 | Norris |
| 5,892,756 A | 4/1999 | Murphy |
| 5,898,837 A | 4/1999 | Guttman et al. |
| 5,915,993 A | 6/1999 | Belopolsky et al. |
| 5,923,663 A | 7/1999 | Bontemps et al. |
| 5,944,535 A | 8/1999 | Bullivant et al. |
| 6,002,331 A | 12/1999 | Laor |
| 6,041,352 A | 3/2000 | Burdick et al. |
| 6,067,014 A | 5/2000 | Wilson |
| 6,078,113 A | 6/2000 | True et al. |
| 6,086,415 A | 7/2000 | Sanchez et al. |
| 6,094,261 A | 7/2000 | Contarino, Jr. |
| 6,168,555 B1 | 1/2001 | Fetterleigh et al. |
| 6,175,865 B1 | 1/2001 | Dove et al. |
| 6,222,908 B1 | 4/2001 | Bartolutti et al. |
| 6,229,538 B1 | 5/2001 | McIntyre et al. |
| 6,234,830 B1 | 5/2001 | Ensz et al. |
| 6,243,510 B1 | 6/2001 | Rauch |
| 6,285,293 B1 | 9/2001 | German et al. |
| 6,330,307 B1 | 12/2001 | Bloch et al. |
| 6,350,148 B1 | 2/2002 | Bartolutti et al. |
| 6,381,283 B1 | 4/2002 | Bhardwaj et al. |
| 6,421,322 B1 | 7/2002 | Koziy et al. |
| 6,424,710 B1 | 7/2002 | Bartolutti et al. |
| 6,434,716 B1 | 8/2002 | Johnson et al. |
| 6,437,894 B1 | 8/2002 | Gilbert et al. |
| 6,453,014 B1 | 9/2002 | Jacobson et al. |
| 6,456,768 B1 | 9/2002 | Boncek et al. |
| 6,499,861 B1 | 12/2002 | German et al. |
| 6,522,737 B1 | 2/2003 | Bartolutti et al. |
| 6,543,941 B1 | 4/2003 | Lampert |
| 6,561,827 B2 | 5/2003 | Frostrom et al. |
| 6,574,586 B1 | 6/2003 | David et al. |
| 6,577,243 B1 | 6/2003 | Dannenmann et al. |
| 6,588,938 B1 | 7/2003 | Lampert et al. |
| 6,601,097 B1 | 7/2003 | Cheston et al. |
| 6,626,697 B1 | 9/2003 | Martin et al. |
| 6,629,269 B1 | 9/2003 | Kahkoska |
| 6,684,179 B1 | 1/2004 | David |
| 6,688,910 B1 | 2/2004 | Macauley |
| 6,714,698 B2 | 3/2004 | Pfeiffer et al. |
| 6,725,177 B2 | 4/2004 | David et al. |
| 6,750,643 B2 | 6/2004 | Hwang et al. |
| 6,778,911 B2 | 8/2004 | Opsal et al. |
| 6,784,802 B1 | 8/2004 | Stanescu |
| 6,798,944 B2 | 9/2004 | Pfeiffer et al. |
| 6,802,735 B2 | 10/2004 | Pepe et al. |
| 6,823,063 B2 | 11/2004 | Mendoza |
| 6,857,897 B2 | 2/2005 | Conn |
| 6,871,156 B2 | 3/2005 | Wallace et al. |
| 6,894,480 B2 | 5/2005 | Back |
| 6,898,368 B2 | 5/2005 | Colombo et al. |
| 6,905,363 B2 | 6/2005 | Musolf et al. |
| 6,906,505 B2 | 6/2005 | Brunet et al. |
| 6,975,242 B2 | 12/2005 | Dannenmann et al. |
| 6,992,491 B1 | 1/2006 | Lo et al. |
| 7,005,861 B1 | 2/2006 | Lo et al. |
| 7,027,704 B2 | 4/2006 | Frohlich et al. |
| 7,028,087 B2 | 4/2006 | Caveney |
| 7,029,137 B2 | 4/2006 | Lionetti et al. |
| 7,038,135 B1 | 5/2006 | Chan et al. |
| 7,049,937 B1 | 5/2006 | Zweig et al. |
| 7,068,043 B1 | 6/2006 | Lo et al. |
| 7,068,044 B1 | 6/2006 | Lo et al. |
| 7,160,143 B2 | 1/2007 | David et al. |
| 7,207,846 B2 | 4/2007 | Caveney et al. |
| 7,234,944 B2 | 6/2007 | Nordin et al. |
| 2002/0069277 A1 | 6/2002 | Caveney |
| 2002/0071394 A1 | 6/2002 | Koziy et al. |
| 2002/0090858 A1 | 7/2002 | Caveney |
| 2002/0116485 A1 | 8/2002 | Black et al. |
| 2003/0046339 A1 | 3/2003 | Ip |
| 2003/0061393 A1 | 3/2003 | Steegmans et al. |
| 2003/0065766 A1 | 4/2003 | Parry |
| 2003/0073343 A1 | 4/2003 | Belesimo |
| 2003/0152087 A1 | 8/2003 | Shahoumian et al. |
| 2004/0044599 A1 | 3/2004 | Kepner et al. |
| 2004/0052471 A1 | 3/2004 | Colombo et al. |
| 2004/0065470 A1 | 4/2004 | Goodison et al. |
| 2004/0073597 A1 | 4/2004 | Caveney et al. |
| 2004/0077220 A1 | 4/2004 | Musolf et al. |
| 2004/0219827 A1 | 11/2004 | David et al. |
| 2005/0052174 A1 | 3/2005 | Angelo et al. |
| 2005/0111491 A1 | 5/2005 | Caveney |
| 2005/0136729 A1 | 6/2005 | Redfield et al. |
| 2005/0141431 A1 | 6/2005 | Caveney et al. |
| 2005/0186819 A1 | 8/2005 | Velleca et al. |
| 2005/0195584 A1 | 9/2005 | AbuGhazaleh et al. |
| 2005/0224585 A1 | 10/2005 | Durrant et al. |
| 2005/0231325 A1 | 10/2005 | Durrant et al. |
| 2005/0239339 A1 | 10/2005 | Pepe |
| 2005/0245127 A1 | 11/2005 | Nordin et al. |
| 2006/0047800 A1 | 3/2006 | Caveney et al. |

(56) References Cited

U.S. PATENT DOCUMENTS

| | | |
|---|---|---|
| 2006/0057876 A1 | 3/2006 | Dannenmann et al. |
| 2006/0282529 A1 | 12/2006 | Nordin et al. |
| 2007/0032124 A1 | 2/2007 | Nordin et al. |
| 2007/0132503 A1 | 6/2007 | Nordin |
| 2008/0265722 A1 | 10/2008 | Saliaris |
| 2008/0266063 A1 | 10/2008 | James |

FOREIGN PATENT DOCUMENTS

| | | |
|---|---|---|
| EP | 0745229 B1 | 3/2003 |
| FR | 2680067 A1 | 2/1993 |
| GB | 2236398 A | 4/1991 |
| GB | 2347751 A | 9/2000 |
| GB | 2347752 A | 9/2000 |
| JP | 676878 | 3/1994 |
| JP | 2004349184 | 12/2004 |
| WO | 9926426 A1 | 5/1999 |
| WO | 0060475 A1 | 10/2000 |
| WO | 0155854 A1 | 8/2001 |
| WO | 2004044599 A2 | 3/2004 |
| WO | 2005072156 A2 | 8/2005 |
| WO | 2006052686 A1 | 5/2006 |

OTHER PUBLICATIONS

"IntelliMAC—The New Intelligent Cable Management Solution by ITRACS & NORDX/CDT," Press Release 2003.

"RiT Technologies Ltd. SMART Cabling System," RiT Technologies Ltd., 2004.

"Ortronics Launches iTRACS—Ready Structured Cabling Solutions," News Release Mar. 7, 2003.

"The SYSTIMAX iPatch System—Intelligent yet simple patching . . . ", CommScope, Inc., 2004.

"White Paper—intelligent Patching." David Wilson, Nov. 2002.

"PatchView for the Enterprise (PV4E) technical backround/Networks for Business," Jun. 24-26, 2003.

"RiT Technologies Ltd. Go Patch-less," May 2000 Edition of Cabling Systems.

"Intelligent Cable Management Systems—Hot Topics", Trescray.

"Brand-Rex Network solutions Access racks Cat 5E6 cabling UK".

"Molex Premise Networks/Western Europe—Real Time Patching System" Molex Prem. Networks, 2001.

"Product of the Week—Molex's Real Time Patching System".

"EC&M Taking Note of Patch Panel Technology," Mark McElroy, Jun. 1, 1998.

"Intelegent Patching SMART Patch for the Enterprise (SP4E)".

PHYSICAL INFRASTRUCTURE MANAGEMENT SYSTEM

CROSS-REFERENCE TO RELATED APPLICATION

This application is a continuation of U.S. patent application Ser. No. 13/666,430, filed Nov. 1, 2012, which will issue as U.S. Pat. No. 8,719,205 on May 6, 2014; which is a continuation of U.S. patent application Ser. No. 12/640,160, filed Dec. 17, 2009, which claims priority to U.S. Provisional Application No. 61/139,975, filed Dec. 22, 2008, the subject matter of which is hereby incorporated by reference in its entirety.

TECHNICAL FIELD

The present application relates to network management systems, and more particularly to a system for acquiring and providing physical location information and other information related to physical layer infrastructure, such as environmental information, about network elements.

BACKGROUND

Communication networks are growing in number and complexity. Data centers that house network elements have likewise grown increasingly large and complex. With this growing complexity, it can be difficult for network administrators to maintain accurate records regarding the physical locations of assets within a communication network. In many cases, the physical location of network assets is tracked manually, with significant opportunities for errors or omissions.

This can lead to many problems for network administrators and technicians. It is possible for an administrator or technician to know where a fault is within a network based on the logical network topology, but not to know exactly where in a particular building the fault is located. More particularly, it is possible in some network management systems to know that a server connected to a particular switch port is experiencing a fault, but if the physical location records are not accurate, it may take a significant amount of work to actually determine the physical location of the faulty server.

The lack of information regarding physical location of assets can also cause problems with network growth planning. For example, a network administrator or technician may have little idea of how much free space, connectivity, thermal capacity, power capacity, or functioning physical layer is available in cabinets in a data center without undertaking a significant effort in manually mapping out the location of network assets and related physical layer infrastructure elements on a cabinet-by-cabinet basis.

Another challenge encountered in expansion planning is a lack of knowledge about the physical environment where expansion is desirable or necessary. For example, an administrator may know that rack space is available for installation of a new group of servers. But the administrator may have little to no information about the impact that adding a server group will have on the power consumption, heat generation, structural cabling, power capacity, weight, security, or grounding in a cabinet or area of a data center. In some cases, this could necessitate an engineering review that will add expense and delay to network expansion projects. In addition, the lack of important information inhibits automation since the physical representation of a network may not be reconciled with the logical connections within the network.

It is desirable to have a system that addresses the problems listed above by automatically acquiring and tracking physical location information regarding network assets and by providing physical layer infrastructure data and other environmental information regarding network installations.

DETAILED DESCRIPTION

The present application provides a system that uses intelligent patch panels with enhanced patch cords and software to enable the discovery and updating of physical location information for network elements, as well as other information associated with a container or other boundary relevant to network design and operations information. The present invention uses hardware and methodologies discussed in U.S. Provisional Patent Application Ser. No. 61/113,868, entitled "Intelligent Patching System," and filed on Nov. 12, 2008, which is incorporated herein by reference in its entirety.

Patch panels can be incorporated into a network in two different general deployment styles. In the first style, called "interconnect," a patch panel is connected directly to network switching over horizontal cabling, with the horizontal cabling generally attached to the back panel of the patch panel. In an interconnect deployment, other network equipment is connected to the front of the patch panel for communication with the network switches. In the second style, called "cross connect," two patch panels are used between a switch and other network equipment that connects to the switch. Both styles of deployment have advantages. An interconnect deployment saves money and space because fewer patch panels are needed, but a cross connect deployment makes it easier to implement changes in connectivity in a network.

A variety of specialized patch cords may be used in connection with the present invention, depending on the particular application. Patch cords may be considered as falling into two general embodiments: a "nine wire" patch cord style, which has one additional conductor in addition to the traditional four-pair Ethernet patch cord, and a "ten wire" patch cord style, which has two additional conductors. While the terms "nine wire" and "ten wire" will be used herein, it is to be understood that these terms are used to refer to patch cords having either one or two additional conductors used for patch cord management functions. For example, a "nine wire" patch cord could be replaced with a fiber optic patch cord having one conductor used for patch cord management functions, in addition to the optical fiber.

According to certain embodiments and applications of the present invention, different specific types of patch cord may be used. In interconnect deployments, nine-wire and ten-wire patch cords that integrate hardware for allowing detection of insertion or removal of their remote ends (the ends not attached to the patch panel) may be used. In cross-connect deployments, intelligent patch panels can be used in conjunction with a nine-wire patch cord style that does not necessarily need to incorporate hardware that allows insertion or removal detection at the remote end of the patch cord. This is because two intelligent patch panels can be used to communicate connectivity information to one another over ninth wires of patch cords.

Figure 1:
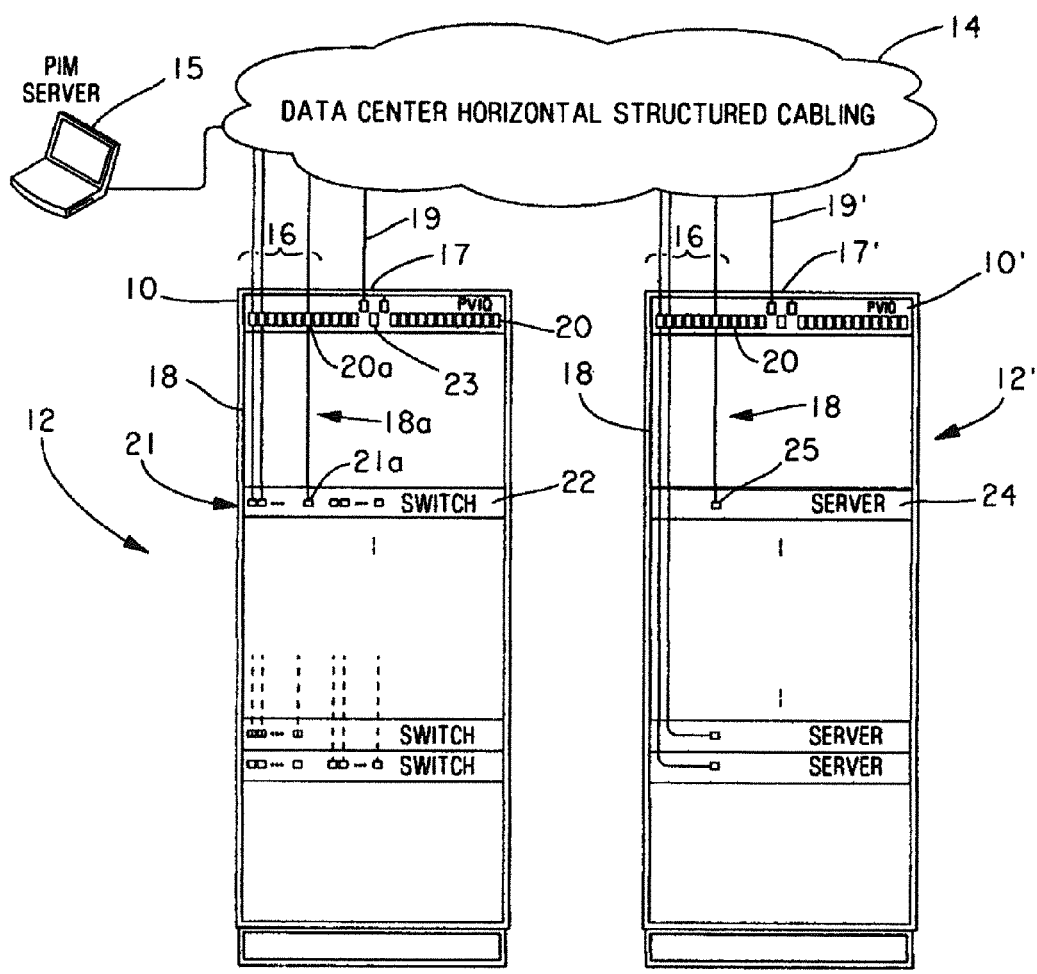
FIG. 1 shows network racks with intelligent patch panels according to one embodiment of the present invention.
Figure 2:
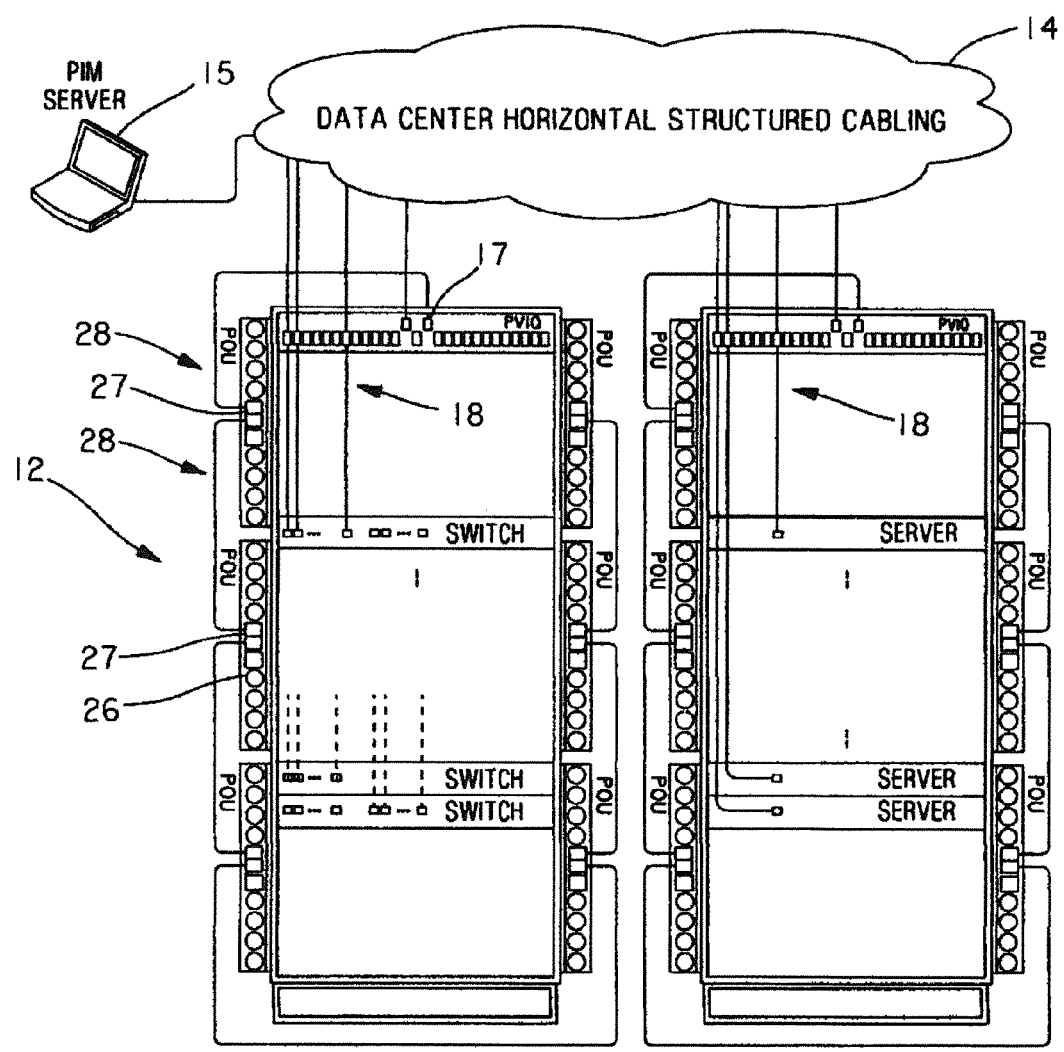
FIG. 2 shows network racks with intelligent patch panels and power outlet units.
Figure 3:
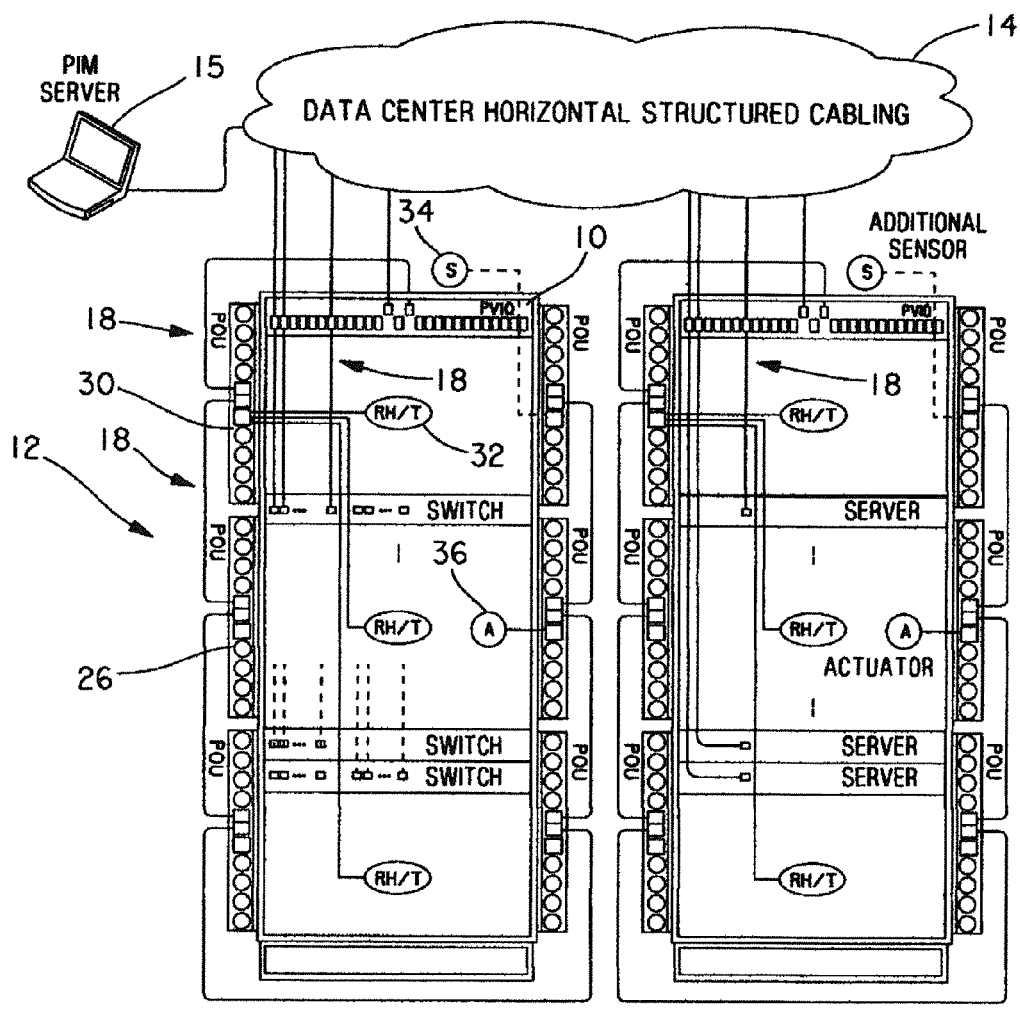
FIG. 3 shows network racks with intelligent patch panels, power outlet units, and sensors.

Turning to FIG. 1, the present invention uses intelligent patch panels installed in cabinets, which may in turn be housed in data centers, data closets, or other locations. Two intelligent patch panels 10 and 10' are illustrated in FIG. 1, as installed in two cabinets 12 and 12'. The intelligent patch panels 10 and 10' have front panel ports 20, and each front panel port 20 is connected to a corresponding rear connector of the patch panel (such as a punchdown connector or a modular connector). The rear connectors, in turn, are connected to other parts of the network (illustrated as structured cabling cloud 14) by horizontal cabling 16. Management ports 17 of the intelligent patch panels 10 (which may be Ethernet ports) are connected via management connections 19 to the network cloud 14, and can transmit data to and receive data from a physical infrastructure management (PIM) server 15 through the structured cabling cloud 14. Although the management ports 17 are illustrated in FIGS. 1-3 as being on the front panels of intelligent patch panels for clarity, it is to be understood that the management ports 17 may be provided on the rear of the intelligent patch panels. The PIM server 15 is illustrated as a laptop in FIG. 1, but it is to be understood that the PIM server runs PIM software and may be implemented on a variety of different hardware platforms, using a variety of interfaces. It is preferred for the PIM server to have a graphical user interface.

Ten-wire patch cords 18 connect patch ports 20 of the intelligent patch panels 10 to network hardware installed in the cabinets 12, including switches 22 and servers 24. For example, in FIG. 1, a ten-wire patch cord 18a connects patch port 20a to switch port 21a. In the embodiment of FIG. 1, all of the network equipment within a cabinet is connected via ten-wire patch cords 18 to patch ports 20 located on the front of the intelligent patch panel 10. Using this connection scheme, if the physical location of an intelligent patch panel 10 is known, including specifically the location of the cabinet 12, then the location of all of the network equipment known to be connected to the corresponding intelligent patch panel 10 is also known and associated with a container, such as a cabinet. Each intelligent patch panel 10 or 10' is provided with physical location information, defining exactly where it is located. Each intelligent patch panel 10 or 10' is further capable of reporting this physical location information to the PIM server 15.

According to one embodiment, the patch cords 18 are provided with insertion detection switches at the plugs of the patch cords that are plugged into the network elements such as the switches and servers (i.e., the plugs on the ends of the patch cord that are not connected to the intelligent patch panels 10). According to another embodiment, insertion or removal detection is accomplished by a ground detection scheme as explained in U.S. Provisional Patent Application Ser. No. 61/113,868.

FIG. 2 shows additional hardware that can be used in one embodiment of the present invention. FIG. 2 contains essentially the same hardware and connections shown in FIG. 1, with the addition of power outlet units (POU's) 26. POU management ports 27 of the POU's 26 can be connected with patch cords 28 via daisy chaining to a management port 17 of the intelligent patch panel 10 installed at the corresponding rack of the POU's 26. The POU's 26 contain power outlets that are used to power network equipment such as switches 22 and servers 24 and allow information about power consumption at the cabinet 12 to be collected by the intelligent patch panel 10. The connection of POU's 26 to an intelligent patch panel 10 allows power and environmental data to be associated with a defined space (e.g., a cabinet). Aspects of power outlet units are disclosed in U.S. Provisional Application Ser. No. 61/040,870, filed on Mar. 31, 2008 and entitled, "Power Outlet Unit," which is incorporated herein by reference in its entirety.

FIG. 3 shows additional hardware that can be incorporated into one embodiment of the present invention. In the embodiment of FIG. 3, various types of sensors are connected to sensing and control ports 30 provided on the POU's 26. Sensors for use with the present invention can include relative humidity and temperature sensors 32. An additional sensor 34 is also illustrated. Examples of sensors that may be used with the present invention include sensors for temperature, relative humidity, or cabinet door position (including a reed switch with a magnet or an equivalent mechanism), and sensors for detecting the quality of grounding connections in the cabinet 12. Other examples of sensors that can be used include those for detecting power quality, bit error rate, and horizontal cabling quality.

Environmental data collected by sensors can provide critical information to data center managers for decision-making related to physical server deployments. The environmental information can also provide useful criteria to virtualization software for its selection of the optimum hardware (including physical infrastructure and server hardware) resources to host virtual machines. Sensor data logs can also provide a record of evidence that compels hardware vendors to honor their warranty repair obligations. Software can turn data such as temperature and current data into easy-to-use and relevant information such as information about thermal capacity, power capacity, and grounding quality, for example.

Actuators 36 can also be connected to the sensing and control ports 30. Examples of actuators that can be used with the present invention include cabinet door locks for security and optical signal beacons (mounted, for example, atop each cabinet) to assist in locating targeted physical assets within large data centers.

Systems and methods of the present invention allow for physical location information regarding network assets connected to intelligent patch panels to be provided to a network management system or PIM software. In addition, the physical locations of network assets later connected to an intelligent patch panel (following initial installation of the intelligent patch panel) will be known because the physical locations of each intelligent patch panel in a network are known by software on the PIM server 15, and perhaps other network management software as may be used in specific network deployments.

The right server cabinet 12' in FIG. 1 connects to the left switch cabinet 12 through the data center's horizontal structured cabling, depicted as cloud 14. The horizontal structured cabling between the cabinets 12 and 12' should connect only directly from the rear of the switch cabinet intelligent patch panel to the rear of the server cabinet patch panel. While this system has been illustrated with only one switch cabinet 12 and only one server cabinet 12', a plurality of switches may undergo distribution within several cabinets, and so may a plurality of servers. The location information methodology of the present invention will still function under these circumstances.

A method of associating physical location data and automated horizontal link detection with network assets will now be described. Returning to FIG. 1, it shows a first cabinet 12 in which switches 22 are installed and a second cabinet 12' in which servers 24 are installed. The process of provisioning the intelligent patch panel 10 in the first cabinet 12 will be described first. The term "provisioning" as used herein refers to the process of providing information to an intelligent patch panel to allow the intelligent patch panel to gain knowledge of the equipment that is connected to it. The term also refers to the process by which the PIM software forms logical connections between an intelligent patch panel and the equipment that is connected to it. This can be done by using a predetermined procedure for serially connecting ports of an intelligent patch panel, as well as equipment within a cabinet, to a provisioning port 23 provided on the intelligent patch panel.

Using a PC to access the intelligent patch panel's management port, a data center technician assigns a unique identifier into each intelligent patch panel's nonvolatile memory to represent:
  (a) Identification labeling of the cabinet (cabinet number);
  (b) Location on the physical floor plan of the data center;
  (c) Cabinet type (switch or server cabinet); and
  (d) Network elements associated with the intelligent patch panel.

If more than one intelligent patch panel resides in a given cabinet, they all receive the same cabinet number and type identifier.

Following the installation of switches 22 and the intelligent patch panel 10 in the first cabinet, the provisioning port 23 is used with the ten-wire patch cords 18 to enable the intelligent patch panel 10 to report to the PIM server 15 which switch ports 21 are connected to which panel ports 20. This can be accomplished using a patch cord installation procedure as described in U.S. Provisional Patent Application Ser. No. 61/113,868, with information about switch port connections being collected when the switch plug of a patch cord is plugged into a switch port and the panel plug of the patch cord is connected to the provisioning port of the intelligent patch panel.

Additional exemplary, useful information that can be collected by or provided to the PIM Software includes:
  (a) switch MAC address;
  (b) switch IP address;
  (c) switch chassis id or serial number;
  (d) switch port identification, MAC address, or IP address;
  (e) assigned host name;
  (f) 3D visualization information in real time or real time;
  (g) uptime;
  (h) model and manufacturer;
  (i) service level agreement information;
  (j) mean time to recovery (MTTR); and
  (k) mean time between failures (MTBF).

Next, the process of provisioning the intelligent patch panel 12' will be described. According to one embodiment of the present invention, a particular provisioning method should be used when installing intelligent patch panels and other network assets in a cabinet to enable physical location information to be collected and managed by a PIM server or other management system. These steps occur after installation of the main distribution area cabinets and switches, horizontal cabling, and server cabinets, along with their intelligent patch panels:

a) Plug a laptop into a management port 17 located on the rear of the intelligent patch panel 10'. Assign to the intelligent patch panel's nonvolatile memory the cabinet ID (identification number) and type (server cabinet patch panel), and the physical location of the cabinet 12'.

b) Insert a nine-wire patch cord 18 into the server cabinet's intelligent patch panel provisioning port 23 (shown in FIG. 1). This signals the intelligent patch panel 10 to start initial mapping of the horizontal cables 16 (provisioning).

c) Insert the other end of the 9-wire patch cord 18 into the cabinet's first front patch panel port 20 (the cabling from the rear of this port already connects through the horizontal cabling to the targeted external switch port). The provisioning port uses CDP (Cisco Discovery Protocol) or LLDP (Link Layer Discovery Protocol) to acquire and memorize information uniquely indicative of the specific external switch and switch port (port MAC address, or switch MAC address and port ID). The intelligent patch panel 10' commits this information to memory (and signals completion to the user).

d) With one end of the 9-wire patch cord 18 still inserted into the provisioning port 23, disconnect the other end from patch panel port 1, and insert it into port 2. The provisioning port 23 again acquires information that identifies the next switch port and commits the information to memory. Repeat for all of intelligent panel ports 20 in the server cabinet 12', in other words, for all of the horizontal cables terminated in the server cabinet.

e) The PIM Software (resident on the PIM server 15 shown as a laptop connected to the structured cabling cloud 14) collects this information from the intelligent patch panel 10 along with its cabinet number, cabinet type, and location. The PIM software may collect this information after initial discovery of the intelligent patch panel 10, and during subsequent periodic polling of the intelligent patch panel 10.

f) The PIM Software resident in the PIM server 15 then:
  looks for all instances of each identified switch port in its database (it should find only two);
  associates each individual server cabinet's intelligent patch panel port with its matching switch cabinet intelligent patch panel port; and
  logically joins each of these port pairs as connected to each other with a horizontal cable.

Through repetition of this method at all of the intelligent patch panel ports in all of the server cabinets in a network, the PIM software maps end-to-end connectivity of all of the copper horizontal cabling in the data center. The PIM software then knows: (1) the spatial location and logical port identification of each terminus of each horizontal cable; (2) the physical and logical location of switches and their cabinets; and (3) the physical and logical location of server cabinets and the associated intelligent patch panels. At this point in the process, the PIM software does not have information about specific server identifications or locations.

Next, the servers are patched in a method that enables the specific physical locations of servers to be known. These steps occur after the provisioning of the server cabinets in conjunction with steps (a) through (f) above. As discussed above, two different patch cord styles may be used in connection with provisioning the ports of the intelligent patch panel 10'.

a) Insert the blade-end of a ten-wire patch cord 18 into the targeted intelligent patch panel port 20 contained within a server cabinet 12'. The intelligent patch panel 10' detects and memorizes the insertion into this port (PIM software has already associated this port with a switch port in, for example, a distribution area, at the other end of the horizontal cable).

b) Insert the switch end ("far" end) of that same ten-wire patch cord 18 into the targeted server port 25.

c) The intelligent patch panel port 20 detects insertion of the intelligent patch cord 18 into the server port and signals the event of this patched connection up to the PIM Software.

d) The PIM Software periodically queries the identified switch about its specific port known to connect at the other end of the horizontal cable. This periodic query allows elapsed time between initial patching of servers within their cabinets and the eventual onset of Ethernet communications from/to those servers.

e) The switch immediately or eventually yields the MAC address of the server connected to its identified port.

f) The PIM software designates that server MAC address as inventory resident within the server cabinet 10'.

PIM software utilizes SNMP (Simple Network Management Protocol) to enable messaging between network devices and a central management console or server. Management Information Blocks (MIBs) contain statistic counters, port status, and other information about these network devices. A management console issues GET and SET commands to operate on particular MIB variables for network equipment nodes. The various network device agents, such as those contained in distributed intelligent patch panels modules, can issue TRAP messages to the PIM server to report events such as patch disconnects and other alerts. Third-party SNMP-based network management systems, such as HP OpenView, may integrate or cooperate with Panduit PIM software if the extended MIB variable structures are shared.

PIM Software discovers all of the devices within the network. According to one embodiment, certain limitations exist with respect to the availability of switch information: the switches must have SNMP activated, and their address table information must generally be made available to the PIM software. With these permissions, the PIM software can discover and aggregate:

a) Switch MAC address;
b) Switch IP address;
c) Switch chassis id or serial number;
d) Switch port identification, MAC address, or IP address;
e) Assigned host name;
f) Model and manufacturer; and
g) The IP and MAC addresses of the active devices connected to each switch port.

Again, data center personnel assigned a unique identifier to the intelligent patch panel in the field to represent its cabinet. Since the intelligent patch panels 10 and 10' (and therefore the PIM software) have memorized the intelligent patch panels' lists of connected switch ports, and since these switches have made their port-connection-to-server data available to the PIM software, then the PIM software can map and designate each of these connected switches and servers as physically resident within their respective cabinets. The PIM software can also map the horizontal cabling connectivity within the data center.

Figure 4:
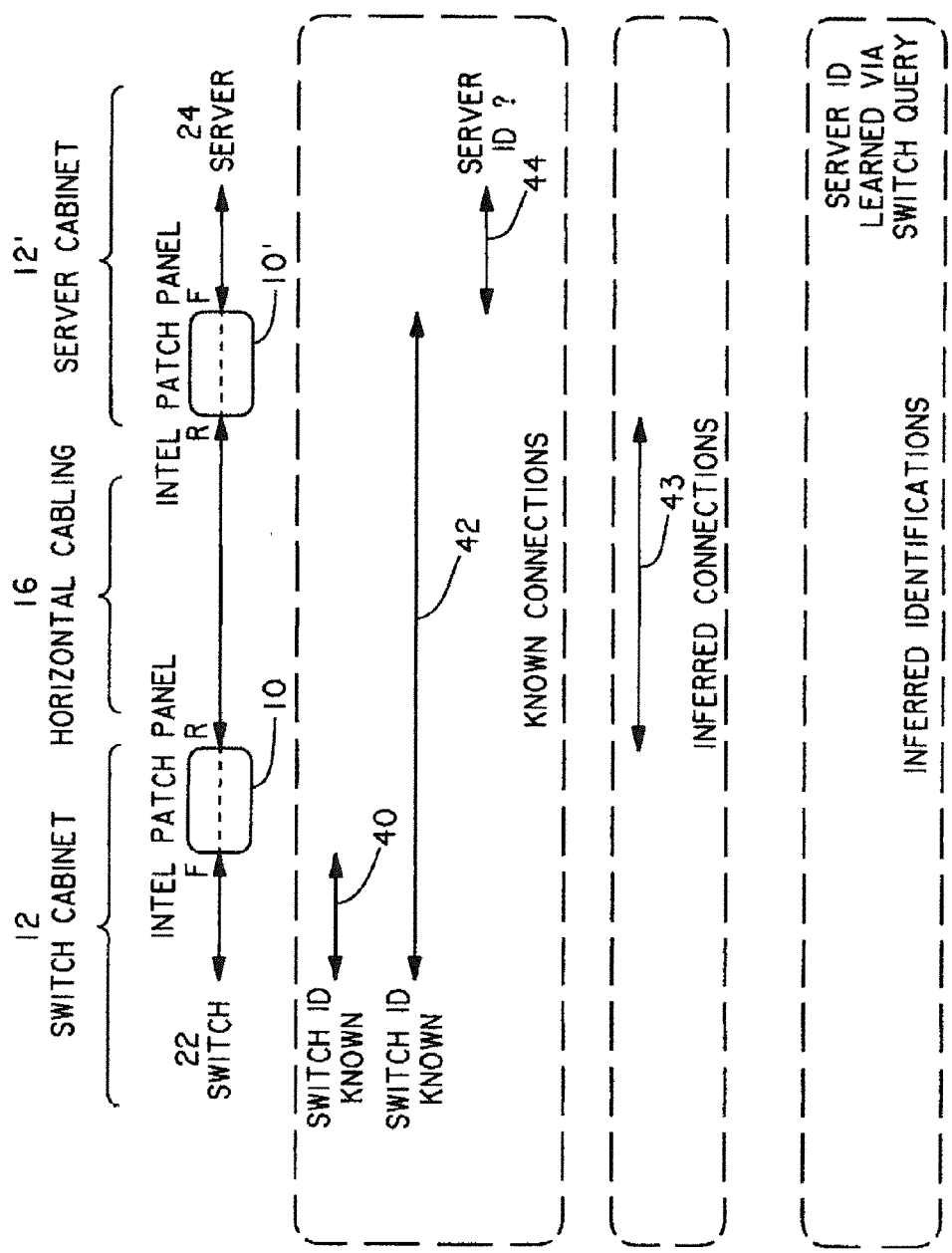
FIG. 4 is a block diagram showing the process of link discovery according to one embodiment of the present invention.

FIG. 4 illustrates the known connections and inferred connections in one embodiment of the present invention. When the intelligent patch panel 10 is installed, provisioned, and connected to a switch 22, the switch ID is known and associated with a particular port of the intelligent patch panel 10. This is indicated by arrow 40 in FIG. 4. Further, when the intelligent patch panel 10' is installed and provisioned, the PIM software is able to complete its knowledge of the link between the switch 22 and the particular port of the intelligent patch panel 10'. This is shown by arrow 42. An inferred knowledge of the horizontal cabling connection between the rear panel of the first intelligent patch panel 10 and the rear panel of the intelligent patch panel 10' is also gained at this time. This inferred knowledge is shown by arrow 43 in FIG. 4. Finally, when the server ID query is accomplished (by obtaining the server ID from the corresponding switch port to which it is connected), the PIM software learns the server ID for each server port that is connected to each front port of the second intelligent patch panel 10'. This is indicated by arrow 44 in FIG. 4.

Figure 5:
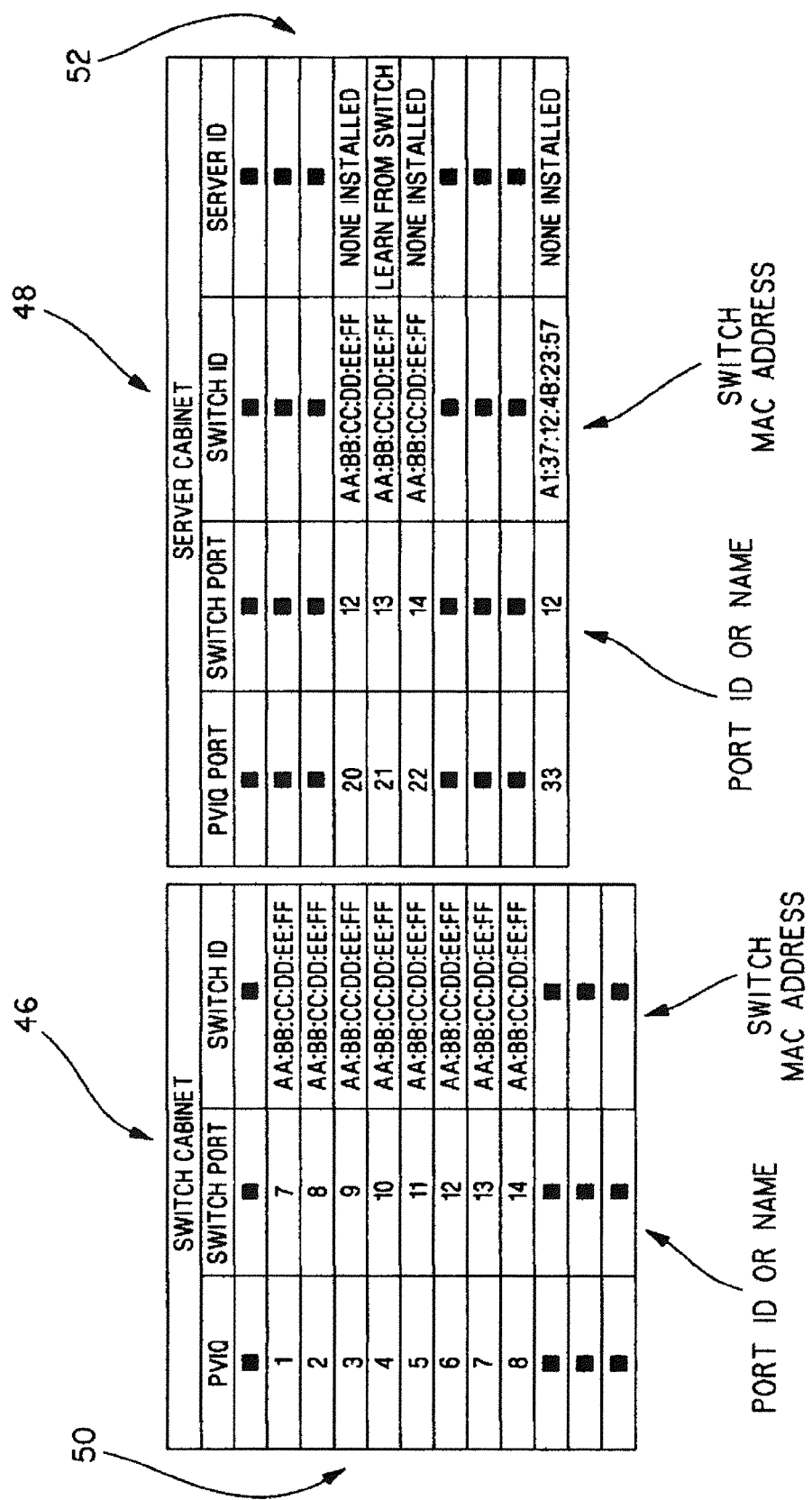
FIG. 5 shows data fields involved in a link discovery process according to one embodiment of the present invention.

FIG. 5 illustrates data known by the PIM software following provisioning steps as outlined above. The left data set 46 shows information known by the PIM software based on information provided to the software by a first intelligent patch panel 10 in a switch cabinet 12. The right data set 48 shows information known by the PIM software based on information provided to the software by a second patch panel 10' in a server cabinet 12'. The highlighted data strings, 50 and 52, show data that are linked by the PIM software based on the software learning that a particular horizontal cable joins switch port number 13 through first intelligent patch panel port number 7, to second intelligent patch panel port 21 to a particular server port. Note that in FIG. 5, the server ID is still to be learned from the switch by the PIM software.

Figure 6:
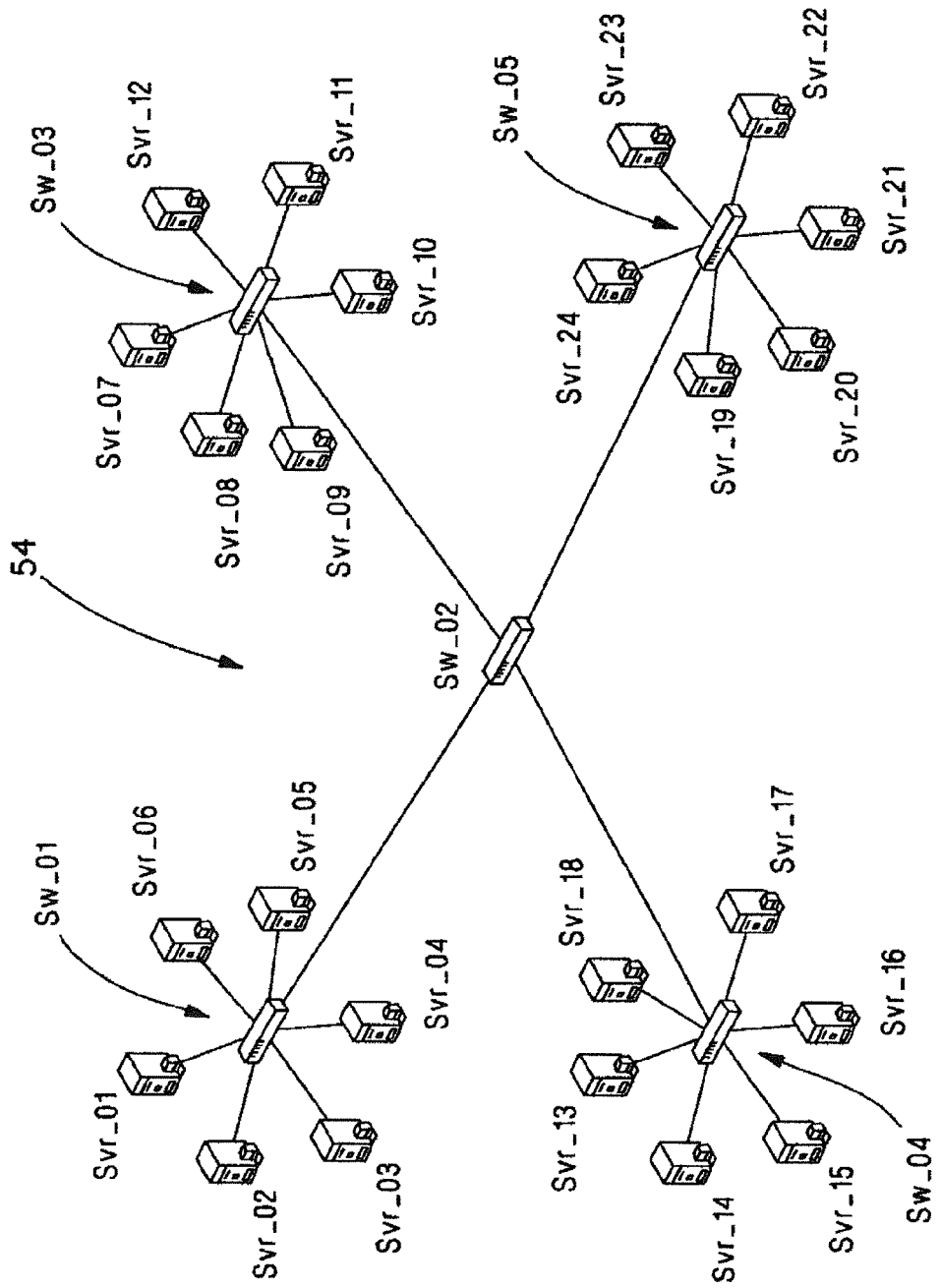
FIG. 6 shows a logical topology of a computer network.
Figure 7:
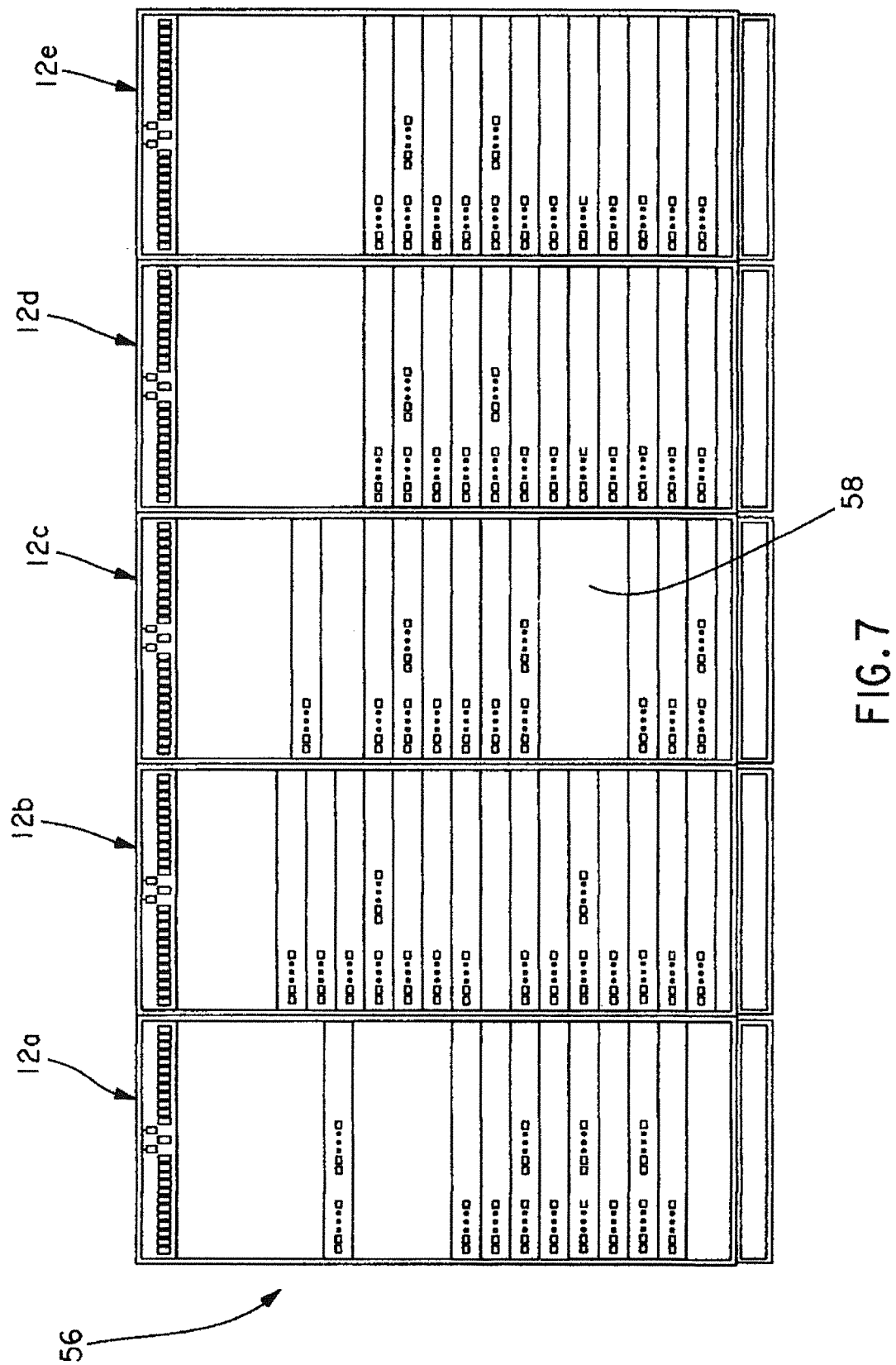
FIG. 7 shows a map indicating the physical locations of devices in a network.

Knowing the physical locations of the intelligent patch panels of the present invention, it is possible for the PIM software to go beyond a typical topological map 54 of network assets, as shown in FIG. 6 to provide a physical location map 56 of network assets as shown in FIG. 7. Using the techniques and hardware of the present invention, it is possible to illustrate to a network administrator or user which specific cabinet (cabinets 12*a-e* are illustrated in FIG. 7) particular network assets are located in. By knowing the size of the network cabinets at issue, the PIM software is also able to inform an administrator about how much free space 58 is available for additional hardware at specific cabinets. The automated knowledge of free space 58 can be combined with the knowledge of environmental and power usage information to allow an administrator to intelligently plan for network expansions without the need for a direct physical inspection of the expansion area. Systems and methods of the present invention can also be used to assist in the creation of work orders by providing location information and other information to technicians.

The ability of a physical infrastructure management system as disclosed herein to automatically reconcile itself (i.e., to confirm that all connections have been implemented as intended and flag any improper implementations) enables automated decisions to be made, such as the virtual movement of an application from one server to another, without the need for a manual verification or reconciliation step.

In the above description, it is to be understood that references to "cabinets" refer to one embodiment of the present invention. It is also possible for the physical location information and other benefits of the present invention to be provided with reference to racks or rooms or other relevant physical locations (i.e., "containers") that house intelligent patch panels.

The invention claimed is:

1. A method of provisioning of a server cabinet in a datacenter, the method comprising the steps of:

connecting a computing device into a management port of an intelligent patch panel in the server cabinet;

assigning to a memory of the intelligent patch panel in the server cabinet a cabinet ID, a cabinet type and a physical location of the server cabinet;

inserting a first end of a patch cord into a provisioning port of the intelligent patch panel in the server cabinet;

initializing a mapping of a plurality of horizontal cables connected to the intelligent patch panel in the server cabinet;

inserting a second end of the patch cord into a first front patch panel port of the intelligent patch panel of the server cabinet;

acquiring and memorizing, by the intelligent patch panel of the server cabinet, information uniquely indicative of a specific external switch and a first switch port connected to the first front patch panel port by one of the horizontal cables;

disconnecting the second end of the patch cord from the first front patch panel port and inserting the second end of the patch cord into a second front patch panel port of the intelligent patch panel of the server cabinet;

acquiring and memorizing, by the intelligent patch panel of the server cabinet, information uniquely indicative of a specific external switch and a second switch port connected to the second front patch panel port by another of the horizontal cables; and repeating the acquiring and memorizing step for all front panel ports of the intelligent patch panel of the server cabinet that have one of the horizontal cables terminated in the server cabinet.

2. The method of claim 1, further including the steps of collecting by the computing device the information of the acquiring and memorizing steps; and associating the information with the cabinet ID, the cabinet type and the physical location of the server cabinet.

3. The method of claim 2, further including the steps of identifying by the computing device all instances of each switch port in a database of the computing device; and associating each of the front panel ports of the intelligent patch panel of the server cabinet with a respective port of an intelligent patch panel port of a switch cabinet.

4. The method of claim 2, wherein the computing device collects the information at least one of after an initial discovery of the intelligent patch panel of the server cabinet, and during subsequent periodic polling of the intelligent patch panel of the server cabinet.

5. The method of claim 1, wherein said acquiring and memorizing steps uses at least one of CDP (Cisco Discovery Protocol) and LLDP (Link Layer Discovery Protocol) to acquire and memorize the information uniquely indicative of the specific external switch and switch port.

6. The method of claim 1, wherein said inserting a first end of a patch cord step includes the substep of signaling the intelligent patch panel in the server cabinet to start initial mapping of the horizontal cables.

7. The method of claim 1, wherein the information uniquely indicative of the specific external switch and switch port can be at least one of port MAC address, and switch MAC address and port ID.

8. The method of claim 1, wherein the patch cord is at least one of a nine-wire patch cord and a ten-wire patch cord.

9. The method of claim 1, wherein the computing device is a laptop computer.

10. The method of claim 1, further including the step of inserting a blade-end of a ten-wire patch cord into a targeted front panel port of the intelligent patch panel in the server cabinet.

11. The method of claim 10, further including the step of detecting and memorizing, by the intelligent patch panel of the server cabinet, the inserting into the targeted front panel port of the intelligent patch panel of the blade-end of the ten-wire patch cord.

12. The method of claim 11, further including the step of inserting a switch end of the ten-wire patch cord into a targeted server port of a targeted server in the server cabinet.

13. The method of claim 12, further including the step of detecting, by the intelligent patch panel of the server cabinet, the inserting of the switch end of the ten-wire patch cord into the targeted server port.

14. The method of claim 13, further including the step of signaling the detecting step of claim 13, by the intelligent patch panel of the server cabinet, to the computing device.

15. The method of claim 14, further including the step of periodically querying, by the computing device, an identified switch about a port of the identified switch which connects to the targeted server port through one of the plurality of horizontal cables.

16. The method of claim 15, further including the step of yielding, by the identified switch, an address of the targeted server.

17. The method of claim 16, wherein said address is a MAC address.

18. The method of claim 16, further including the step of designating, by the computing device, the address of the targeted server as inventory resident within the server cabinet.

19. The method of claim 10, wherein the ten-wire patch cord is an intelligent patch cord.

* * * * *